United States Patent [19]

Leary et al.

[11] Patent Number: 4,650,576

[45] Date of Patent: Mar. 17, 1987

[54] APPARATUS FOR REGENERATIVE HEATING OF DIESEL FUEL

[75] Inventors: David F. Leary, Woodside; Richard N. Olds, Los Altos, both of Calif.

[73] Assignee: Raychem Corporation, Menlo Park, Calif.

[21] Appl. No.: 687,120

[22] Filed: Dec. 28, 1984

[51] Int. Cl.[4] .............................. F02M 31/00
[52] U.S. Cl. ..................... 210/184; 123/557
[58] Field of Search ............ 210/181, 184–186, 210/149; 123/557

[56] References Cited

U.S. PATENT DOCUMENTS

| 4,395,996 | 8/1983 | Davis | 123/557 |
| 4,397,287 | 8/1983 | Pierard | 123/557 |
| 4,473,054 | 9/1984 | Marcoux et al. | 123/557 |
| 4,477,345 | 10/1984 | Szaga, Jr. | 210/184 |
| 4,477,715 | 10/1984 | Bell et al. | 210/184 |
| 4,495,069 | 1/1985 | Davis | 210/149 |
| 4,501,255 | 2/1985 | Van Der Ploeg et al. | 123/557 |
| 4,529,866 | 7/1985 | Leary | 210/184 |

Primary Examiner—John Adee
Attorney, Agent, or Firm—Stephen C. Kaufman; Timothy H. P. Richardson; Herbert G. Burkard

[57] ABSTRACT

Apparatus for heating and filtering diesel fuel in which incoming diesel fuel is passed in a heat-exchange relationship with already heated and filtered diesel fuel, is further heated by either an electric heater or by other means, is passed through a filter, and then is passed in a regenerative heat-exchange relationship with the incoming diesel fuel.

9 Claims, 4 Drawing Figures

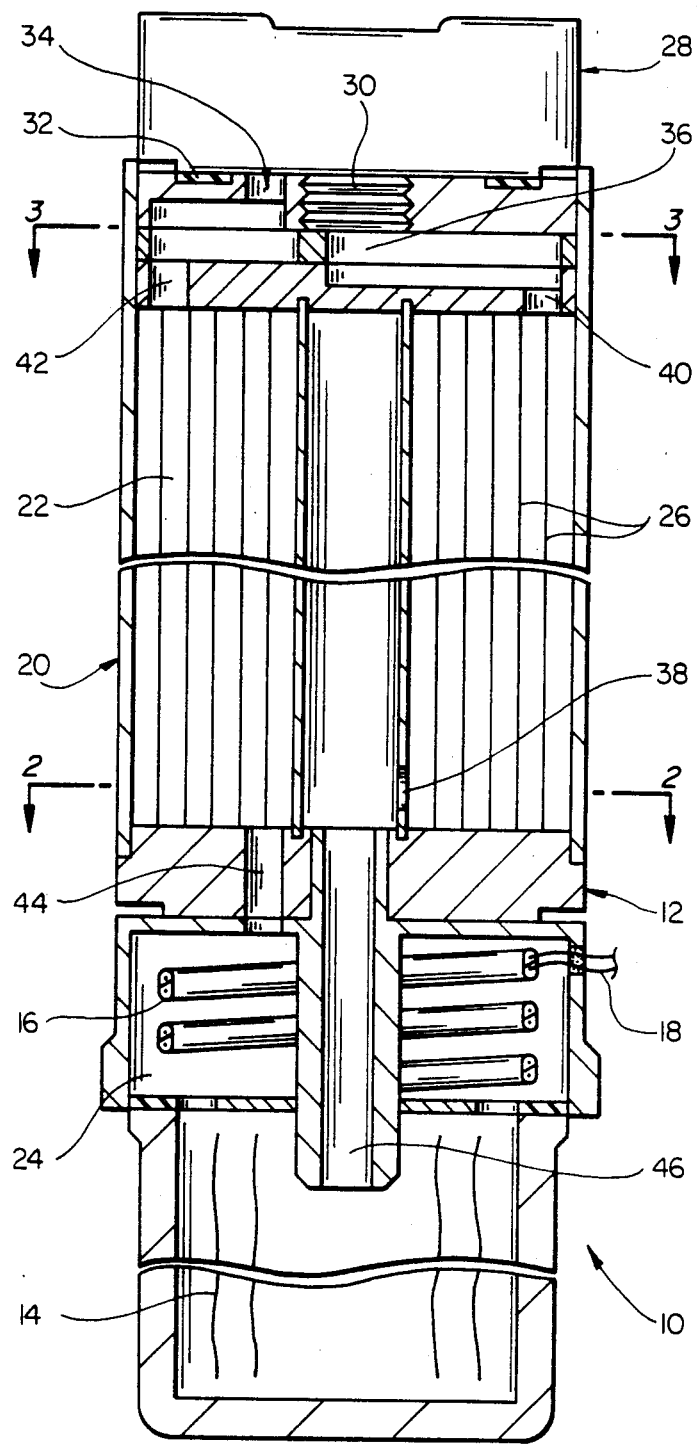
FIG_1

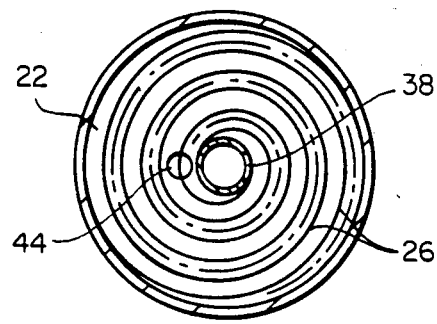
FIG_2
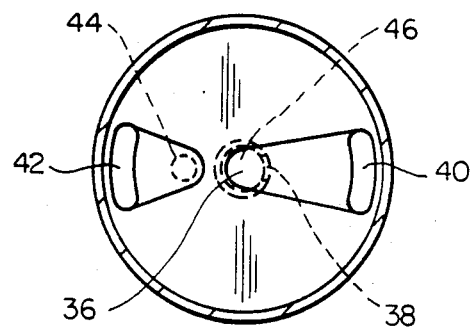
FIG_3
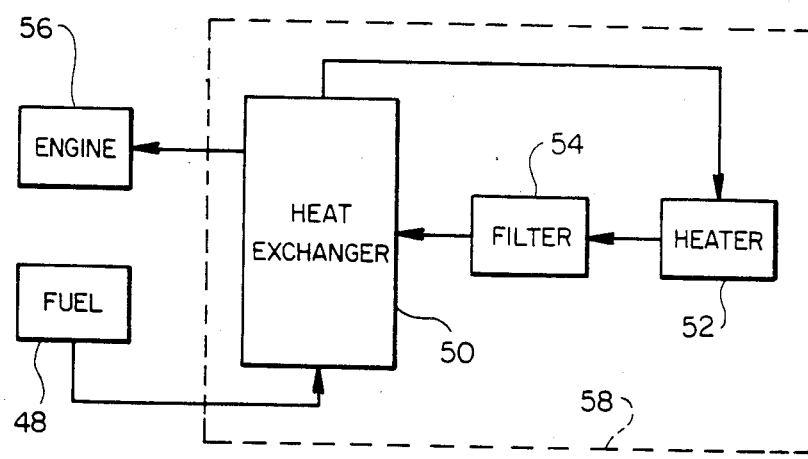
FIG_4

APPARATUS FOR REGENERATIVE HEATING OF DIESEL FUEL

BACKGROUND OF THE INVENTION

1. Related Application

This application is related to U.S. patent application Ser. No. 687,117, now abandoned, filed even date herewith entitled "METHOD FOR REGENERATIVE HEATING OF DIESEL FUEL" which is incorporated herein by reference.

2. Field of the Invention

This invention relates to the filtering and regenerative heating of diesel fuel as it passes from a fuel tank (or other fuel source) to a diesel engine.

3. Introduction to the Invention

If diesel fuel becomes too cold, higher molecular weight hydrocarbons therein can solidify, causing "clouding" of the fuel. These solids can block the pores of a fuel filter through which the fuel is pumped, causing the engine to lose power (or stop) or preventing the engine from starting. In order to prevent this, various methods have been proposed for heating diesel fuel before it reaches the filter. For disclosure of such methods, reference may be made, for example, to U.S. Pat. Nos. 2,669,299, 3,564,199, 3,935,901, 3,989,019, 4,091,265, 4,372,279, 4,398,084 and 4,406,785 and copending and commonly-assigned U.S. patent application Ser. Nos. 382,259, (now abandoned) 423,589 and 474,390 (now U.S. Pat. No. 4,529,866).

The known systems for the electrical heating of diesel fuel suffer from the disadvantage that the output of the heater must be sufficient to heat all the diesel fuel passing through the fuel system from its storage temperature to a temperature above its cloud point. This is a particularly serious disadvantage when the heater is powered by the electrical system of a vehicle, which has only a limited amount of total power available. Typically, a heater having a power output of 100–150 watts is needed for a car or light truck, with proportionately larger power outputs needed for fuel systems handling larger fuel throughputs, e.g., 450–600 watts for a large truck. Equally important is the fact that the heater may continue to draw power at this rate for a considerable time, so that even if the vehicle batteries can provide the necessary power initially, they cannot continue to do so.

We have now realized that the outgoing diesel fuel (i.e., the fuel which has been filtered) need not be maintained above its cloud point after it has been filtered and that is is therefore possible to reduce the thermal output needed from the heater by passing the outgoing heated and filtered fuel in a regenerative heat-exchange relationship with the incoming fuel to preheat the incoming fuel. This creates a type of regenerative cycle in which low-grade heat that is not necessary after filtering and that would be lost is used to improve thermal efficiency. The present invention makes possible substantial reductions in the power output required of the heater under steady-state conditions, in order to produce a particular increase in the temperature of the fuel as it is filtered, for example a reduction of the power output to less than 25% of that required without any transfer of heat from the outgoing fuel to the incoming fuel as will be seen in the table disclosed later herein.

It is also known, as taught in U.S. Pat. No. 4,372,260, to further heat the fuel after leaving the filter before it is delivered to the engine. The heat-exchanger taught in this disclosure therefore works the opposite of the instant invention wherein the already-heated fuel leaving the filter is used in a heat-exchange with cold incoming fuel to preheat the fuel in a regenerative cycle to improve thermal efficiency.

SUMMARY OF THE INVENTION

The purpose of the instant invention is to provide apparatus for heating and filtering diesel fuel. To accomplish this purpose, incoming diesel fuel is passed in heat-exchange relationship with already heated and filtered fuel, the heat of the filtered fuel working in a regenerative fashion to reduce the amount of heat and therefor power required to heat the diesel fuel before filtering.

In one aspect, the invention provides apparatus for at least heating diesel fuel as it is pumped from a fuel source in which the fuel is at a temperature below its cloud point, which apparatus comprises:

(1) a heater to heat fuel, said heater connectble to a fuel filter;

(2) heat-exchange means connected to the heater, said means having a heat-exchange member therein which is positioned so that incoming fuel pumped from a fuel source going to the heater passes on one side of the member and outgoing filtered fuel emerging from a fuel filter passes on the other side of the member, said heat-exchange means capable of regenerative heat-exchange with the incoming fuel to transfer heat from outgoing fuel to incoming fuel before the incoming fuel enters the heater.

In another aspect, the invention provides apparatus for heating diesel fuel before it is filtered and for transferring heat from filtered diesel fuel to diesel fuel to be heated and to be then filtered, said apparatus being removably securable between a fuel manifold and a fuel filter of the fuel supply system of a diesel-engined vehicle, said apparatus comprising:

(1) an electric heater;

(2) means for connecting the heater to a power supply;

(3) a housing which comprises:

(a) a heat-exchange chamber having a heat-exchange member therein and having at least a first entry port for the entry of filtered diesel fuel from a fuel filter when the housing is secured to a fuel filter, and at least a first exit port for the exit of fuel to a fuel manifold when the housing is secured to a fuel manifold; said first entry and exit ports defining a first passage therebetween on one side of said heat exchange member, said heat exchange chamber having a second entry port for entry of diesel fuel from a fuel manifold and having a second exit port for the exit of fuel to a heating chamber, said second entry and exit ports defining a second passage on the other side of said heat-exchange member; heat from said first passage capable of being transferred to said second passage through said heat-exchange member; and (b) a heating chamber having at least one heating chamber entry port for the entry of diesel fuel from the second exit port of the heat exchange means and at least one heating chamber exit port for the exit of diesel fuel to a filter when the housing is secured to a fuel filter, the electrical heater being within the heating chamber.

BRIEF DESCRIPTION OF THE DRAWING

FIG. 1 is a cross-sectional view of the apparatus used to practice the method of the instant invention;

FIG. 2 is a sectional view taken along section lines 2—2 in FIG. 1;

FIG. 3 is a sectional view taken along section lines 3—3 in FIG. 1;

FIG. 4 is a schematic view of the instant invention in its most general aspect.

DETAILED DESCRIPTION OF THE PREFERRED EMBODIMENT

Any type of heater can be used in this invention including electric heaters or heaters which operate by heat-exchange with some fluid carrying waste heat from the operating diesel engine, such as exhaust gas, engine coolant or return fuel. These various heat sources are herein referred to as heaters and are not to be confused with the regenerative heat-exchanger of the instant invention. It is preferable, however, to use a self-regulating heater, e.g. a heater comprising a PTC conductive polymer heating element such as an elongate strip heater comprising parallel wire electrodes embedded in a sheet or strip of conductive polymer comprising a cross-linked fluoropolymer having carbon black dispersed therein. The heater can be placed inside or outside the heating chamber, but is preferably placed inside, especially when a self-regulating heater is used. The heater can be powered from any power source, but when the invention is used on a diesel-engined vehicle, as is preferred, it is preferably connected to the electrical system of the vehicle. Specific heaters are disclosed in U.S. Pat. Nos. 3,564,199, 3,935,901, 3,989,019, 4,091,265, 4,177,376, 4,304,987, 4,372,260, 4,372,279 and 4,406,785 which are incorporated herein by reference.

The heat exchange between the incoming and outgoing fuel can be effected wholly or partly before the incoming fuel is heated by the heater. However, it is more efficient, i.e. uses less electrical power by recovering waste heat, to heat the incoming fuel by heat exchange with the outgoing fuel prior to heating by the heater. It is within the scope of the invention to perform these functions within the same chamber or plenum as long as the net heat transfer is from the already heated, filtered fuel to the incoming fuel.

With continued reference to the drawing, FIG. 1 discloses apparatus shown generally at 10 for heating and filtering diesel fuel as it is pumped from a fuel source in which the fuel may be at a temperature below its cloud point. The apparatus comprises a housing shown generally at 12 for heating diesel fuel before it is filtered, and a filter 14. The apparatus utilizes an electrical heater 16 or the like having means 18 for connecting the heater to a power supply (not shown). The housing comprises a heat-exchange means in the form of a heat-exchange chamber 22 and a heating chamber 24, the electrical heater 16 being within the heating chamber 24. The heat-exchange chamber 22 contains a heat-exchange member 26 which is thermally conductive continuous double spiral partitions which maintain incoming fuel physically separate from outgoing heated and filtered fuel. Heat exchangers with double spiral partitions are also referred to as dual spiral plate heat exchangers.

The device 20 for heating diesel fuel before it is filtered and for transferring heat from the filtered diesel fuel to the diesel fuel to be heated and then filtered, is removably securable between a fuel manifold shown generally at 28 and a fuel filter 14. As seen in FIG. 1, the apparatus is removably secured by pipe threads 30 or the like, and is sealed with respect to the manifold by gasket means 32. The fuel filter 14 is likewise secured to the apparatus by threads (not shown) and a gasket or by other equivalent means. Incoming fuel to be heated and filtered is introduced into the apparatus at an inlet shown generally at 34 and exited at an outlet shown generally at 36. Heat-exchange chamber 22 has at least a first entry port 38 for the entry of filtered diesel fuel from the fuel filter 14 when the housing is secured to the fuel filter 14, and at least a first exit port 40 corresponding to the device and apparatus exit 36 for the exit of fuel to the fuel manifold 28 when the housing is secured to the fuel manifold. The first entry port 38 and the first exit port 40 define a first passage therebetween on one side of the heat-exchange member 26.

The heat-exchange member has a second entry port 42 corresponding to the apparatus inlet 34 for entry of diesel fuel from the fuel manifold 28, and has a second exit port 44 for the exit of fuel to the heater chamber 24 having heater element 16. The second entry port 42 and the second exit port 44 define a second passage on the other side of said heat-exchange member 26. Heat from the first passage is capable of being thermally transferred to said second passage through said heat-exchange member 26 to warm the incoming fuel before it passes into the heating chamber 24 and before it then passes into the filter 14. Separation of first and second passages can be more clearly seen in FIG. 2 wherein the second passage terminating at second exit port 44 is traced in phantom line for purpose of illustration.

FIGS. 2 and 3 are sectional views taken with respect to FIG. 1. By a comparison of these figures it can be seen, for example in FIG. 3, that fuel entering via inlet 34 and second entry port 42 at the top of the device will be kept separate by heat-exchange member 26 from exiting fuel as it travels around the spiral path, eventually to exit through second exit port 44 (also shown in phantom in FIG. 3) into the heater section 16. Likewise it can be seen that fuel returning from filter 14 through center core 46 will re-enter the heat-exchange section through first entry port 38 and proceed through the spiral pathway to exit at first exit port 40. It is understood that the heat-exchange member 26 completely separates the two first and second fuel passages as described above from each other. The unique spiral configuration provides an extremely large surface area of contact in a compact cylindrical envelope.

FIG. 4 is a schematic view of the instant invention wherein incoming diesel fuel 48 is passed through a heat exchanger 50 in heat-exchange relationship with outgoing filtered fuel and is preheated and then proceeds to heater 52 for further heating such as by means of an electrical heater before being passed through filter 54. The heated and now filtered fuel passes from the filter 54 in regenerative heat-exchange relationship back through the heat exchanger 50 by a separate and distinct path for use in the engine 56. The apparatus of the instant invention is shown contained within the dashed line 58.

It is within the scope of the invention to use other types of heat exchangers such as a tube and shell heat-exchanger, double-pipe heat-exchangers and parallel plate heat-exchangers.

Heater 52 may be any one of a number of heating devices which are capable of raising the temperature of the fuel placed in contact with the heater. An example is the coiled heater disclosed in commonly-assigned U.S. patent application Ser. Nos. 474,390, filed Mar. 11, 1983, and 606,033, filed May 1, 1984, which are incorporated by reference herein. Other types of heaters such as electrical resistance wires, barium titanate PTC resistors, mineral insulated cable and self-regulating heaters as described in U.S. Pat. No. 4,177,376 referred to earlier may be used.

It is also within the scope of the invention to utilize other heating sources (other than electrically-generated heating sources), as for example heat exchangers utilizing engine coolant, engine oil, exhaust gas, hot return fuel or devices mounted directly on the engine.

A device as shown in FIG. 1 and functioning per the diagram of FIG. 4 was connected to a variable flow rate diesel fuel pump and reservoir system and a source of direct current electrical power.

The results obtained are shown in the Table below. It can be seen that in the case of a 0.5 gallon-per-minute flow rate a reduction of the power output to 24% of that necessary to product an equivalent fuel temperature rise at the filter inlet without any transfer of heat from the outgoing fuel to the incoming fuel was achieved by the regenerative heat exchanger. In the case of a higher fuel flow rate of 0.68 gallons-per-minute a reduction of power output to 17% of that necessary to produce an equivalent temperature rise at the fuel filter inlet without any transfer of heat from the outgoing fuel to the incoming fuel was achieved by the regenerative heat exchanger.

TABLE

| FLOW RATE GPM | FUEL INLET °F. | TOTAL ΔT °F. | HEATER ΔT °F. | EXCHANGER ΔT °F. | % TOTAL FROM EXCHANGER |
|---|---|---|---|---|---|
| 0.5 | 9 | 45 | 10.8 | 34.2 | 76% |
| 0.68 | 18 | 32 | 5.5 | 26.5 | 83% |

| % TOTAL FROM HEATER | % IMPROVEMENT OVER HEATER ALONE | ACTUAL HEATER | | | EQUIVALENT HEATER WATTS FOR SAME EFFECT |
|---|---|---|---|---|---|
| | | Volts | Amps | Watts | |
| 24% | 318% | 14 | 14.7 | 205.8 | 860 |
| 17% | 482% | 14 | 16 | 224 | 1300 |

The apparatus can be configured so that the heat-exchange chamber and the heating chamber are integral. Such an integral unit and the fuel filter can be removably securable to each other and in turn removably securable to a fuel manifold. In practice, this invention can be used either with spin-on filters or replaceable element filters. In an integral heater and heat-exchange unit, a cavity for a replaceable filter element with appropriate fuel passages may be included. In a preferred embodiment, the heating chamber and the heat-exchange chamber form part of an integral unit which can be secured between the fuel manifold and the filter of a conventional vehicle fuel system, so that the integral unit can be retrofitted to the conventional system with little difficulty. In another embodiment of this invention, a water separator may also be incorporated into the apparatus either anywhere prior to the filter, as part of the filter, or anywhere after the filter.

Having described one embodiment of the present invention, it should now be apparent to those skilled in the art that numerous other embodiments are contemplated as falling within the scope of this invention.

What is claimed is:

1. Apparatus for heating diesel fuel before it is filtered and for transferring heat from filtered diesel fuel to diesel fuel to be filtered, said apparatus comprising means for removably securing it between a fuel manifold and a fuel filter of a fuel supply system of a diesel-engined vehicle, said apparatus comprising:
    (1) an electric heater;
    (2) means for connecting the heater to a power supply; and
    (3) a housing which comprises:
        (a) a heat-exchange chamber having a heat-exchange member therein and having a first entry port for the entry of filtered diesel fuel from a fuel filter when the apparatus is secured to a fuel filter, and a first exit port for the exit of fuel to a fuel manifold when the apparatus is secured to a fuel manifold; said first entry and exit ports defining a first passage therebetween on one side of said heat exchange member, said heat exchange member having a second entry port for entry of diesel fuel from a fuel manifold when the apparatus is secured to a fuel manifold and having a second exit port for the exit of fuel to a heating chamber, said second entry and exit ports defining a second passage on the other side of said heat-exchange member so that heat from said first passage can be transferred to said second passage through said heat-exchange member; and
        (b) a heating chamber having a heating chamber entry port for the entry of diesel fuel from the second exit port of the heat exchange means and a heating chamber exit port for the exit of diesel fuel to a filter when the apparatus is secured to a fuel filter, the whole of the electrical heater being within the heating chamber;
    whereby, when (i) said heater is connected to a power supply, (ii) the apparatus is secured between a fuel manifold and a fuel filter of a fuel supply system of a diesel-engined vehicle, and (iii) diesel fuel is pumped through the apparatus and the filter, the fuel passes sequentially through the second passageway, through the heating chamber, through the filter and through the first passageway, and heat is transferred from the filtered diesel fuel in the first passageway to the incoming diesel fuel in the second passageway, the whole of said heat transfer taking place before the fuel is heated by the heater.

2. Apparatus according to claim 1 wherein the heater is a self-regulating heater.

3. Apparatus according to claim 2 wherein the heater comprises a PTC conductive polymer heating element.

4. Apparatus according to claim 3 wherein the heating element comprises a cross-linked fluoropolymer having carbon black dispersed therein.

5. Apparatus according to claim 2 wherein the heat-exchange member is a thermally conductive continuous spiral partition.

6. Apparatus according to claim 2 further including a fuel filter connected to said heater and said heat-exchange means.

7. Apparatus according to claim 6 wherein the heater, heat-exchange means and fuel filter are enclosed within a common housing.

8. Apparatus according to claim 6 further including a water separator operatively connected to the fuel filter to separate water from the fuel.

9. Apparatus according to claim 8 wherein the heater, heat-exchange means, the fuel filter and the water separator are enclosed within a common housing.

* * * * *